United States Patent [19]

Larsen et al.

[11] 4,230,157
[45] Oct. 28, 1980

[54] PIPE HAVING AN END PORTION, THE INNER WALL OF WHICH IS PROVIDED WITH A CIRCUMFERENTIAL GROOVE, IN WHICH A SEALING MEANS IS MOUNTED AND A PIPE JOINT CONSISTING OF THIS PIPE AND A SPIGOT END OF A SECOND PIPE INSERTED THEREIN

[75] Inventors: Christian Larsen, Gjern; Per D. Frederiksen, Skanderborg; Ebbe N. Sørensen, Højbjerg, all of Denmark

[73] Assignee: Wavin B.V., Zwolle, Netherlands

[21] Appl. No.: 8,035

[22] Filed: Jan. 31, 1979

[30] Foreign Application Priority Data

| Feb. 3, 1978 | [DK] | Denmark | 502/78 |
| Feb. 3, 1978 | [DK] | Denmark | 503/78 |
| Feb. 16, 1978 | [DK] | Denmark | 705/78 |
| Jun. 12, 1978 | [DK] | Denmark | 2619/78 |
| Jul. 14, 1978 | [DK] | Denmark | 3173/78 |
| Jan. 26, 1979 | [DK] | Denmark | 347/79 |

[51] Int. Cl.³ .................. F16L 9/22; F16J 15/32; F16L 19/00
[52] U.S. Cl. ........................ 138/155; 138/107; 277/207 A; 285/336; 285/345; 285/344
[58] Field of Search ............. 138/109, 178, 155; 277/207 A; 285/335, 336, 344, 345

[56] References Cited

U.S. PATENT DOCUMENTS

| 1,969,789 | 8/1934 | Finkey | 277/207 A X |
| 2,314,386 | 3/1943 | Brend | 277/207 A X |
| 3,018,785 | 1/1962 | Adams et al. | 277/207 A |
| 3,390,890 | 7/1968 | Kurtz | 277/207 A X |
| 3,510,140 | 5/1970 | Hermann | 277/207 A X |
| 3,973,783 | 8/1976 | Skinner et al. | 277/207 A X |
| 4,114,657 | 9/1978 | Langenfeld | 277/DIG. 2 |

FOREIGN PATENT DOCUMENTS

| 1921956 | 11/1970 | Fed. Rep. of Germany | 277/207 A |
| 807205 | 1/1959 | United Kingdom | 277/207 A |

Primary Examiner—Richard E. Aegerter
Assistant Examiner—James E. Bryant, III
Attorney, Agent, or Firm—Wilkinson, Mawhinney & Theibault

[57] ABSTRACT

A pipe having a sealing member (3) in an inner groove (2) at one pipe end (1). The sealing member provides a very effective seal relative to a spigot end (1a) of another pipe inserted in the pipe in question. The free ends of lip portions (6,7) of a sealing ring (4) (the cross section of which is of V-shape when undeformed) are provided with beads (8) so that behind a stiffening ring (5) surrounding said sealing ring (4) there is more volume of lip material than there is room for in the space confined by the adjacent part of the bottom of the groove (2), the exterior (1a') of said spigot end (1a), the rearmost sidewall (2') of the groove (2) and the stiffening ring (5). The pipe is preferably a plastic pipe.

19 Claims, 17 Drawing Figures

PIPE HAVING AN END PORTION, THE INNER WALL OF WHICH IS PROVIDED WITH A CIRCUMFERENTIAL GROOVE, IN WHICH A SEALING MEANS IS MOUNTED AND A PIPE JOINT CONSISTING OF THIS PIPE AND A SPIGOT END OF A SECOND PIPE INSERTED THEREIN

The present invention relates to a pipe having an end portion, the inner wall of which is provided with a circumferential groove, in which a sealing means is mounted, said sealing means comprising a sealing ring, preferably of rubber, having a substantial V-shaped cross-section when undeformed consisting of at least two lip portions, and a stiffening body in cooperation with the sealing ring for holding one of the lips in the groove.

A pipe is known having a socket at one end, said socket being provided with an inner sealing means in the form of a sealing ring, inside of which two stiffening rings are mounted. The sealing means is not, however, mounted in a groove in the socket. The sealing ring has a substantially V-shaped cross-section. The free end of one V-lip is somewhat thick, whereas the free end of the second V-lip is rather narrow. Measured in axial direction the socket is approximately 1½ times longer than the sealing means. When the spigot end of a second pipe has been inserted into the socket, there is quite a lot of room between the outer surface of the spigot end and the inner surface of the socket to allow axial displacement of part of the sealing ring material further into the socket. For this reason there is no great degree of compression in the sealing ring behind the stiffening rings when viewed in axial direction from the end of the socket and consequently a rather insufficient seal between the socket and the spigot end is provided.

The object of the invention is to provide a pipe of the above type, which permits an especially effective seal between one end of the pipe and the spigot end of a second pipe inserted therein.

The pipe according to the invention is characterized in that the lengths of the lip portions of said sealing ring are such that both lip portions, when seen from the mouth of the pipe end portion, extend farther into the pipe than said stiffening body, and in that the dimensions of said lip portions are such that there is more volume of lip material behind said stiffening body, when viewed from the mouth of the pipe end portion, than there is room for in the space confined by the adjacent part of the bottom of the groove, the exterior of the spigot end of the second pipe to be inserted into the pipe end portion, the rearmost sidewall of the groove and the stiffening body, so that the lip material in a state of compression and deformation substantially fills up said space. Thus a substantial compression but also a little displacement of the sealing ring material behind the stiffening body is established, and consequently an especially good seal between the two pipes is provided.

According to the invention one or both of the lip portions of the sealing ring may have a circumferential bead or ridge along its outer edges, i.e. substantially behind said stiffening body, when viewed from the mouth of the pipe end. As a result particularly good opportunities for the desired compression of lip material behind the stiffening ring are obtained.

Furthermore according to the invention a lubricant may be provided between the sealing ring and the bottom of the groove. By this means the sealing ring material, which is displaced behind the stiffening body, when viewed from the mouth of the pipe end, may rather easily be distributed under the stiffening body, thereby ensuring a more effective seal.

Moreover according to the invention a lubricant may be provided between the sealing ring and the stiffening body, also ensuring to a great degree better distribution of the sealing ring material under the stiffening body.

According to the invention the stiffening body surrounded by the lip portions may be a stiffening ring having one or more axial recesses, such as notches, extending radially and inwardly, and being formed so that the parts of said stiffening ring around said recess or recesses may be pressed inwardly so that the stiffening ring may be deformed to a kidney-like shape. By this means the stiffening ring and consequently the entire sealing means consisting of sealing ring and stiffening ring may more easily be mounted in the pipe groove in question, as the stiffening ring—possibly together with the sealing ring—is deformed during insertion into a kidney-lik shape, thus taking up less room. They may be inserted axially into position in the groove without hindrance. The stiffening ring is then left alone, so that it presses the sealing ring outwardly with slight pressure. In principle the sealing ring and the stiffening ring may be mounted separately.

According to the invention the stiffening ring may have a substantially rectangular cross-section.

If the stiffening ring has two recesses, they may according to the invention be arranged in close proximity of each other, thus facilitating the manufacture, as the stiffening ring is easily made by injection molding in plastic, such as polypropylene. The rather weak joint line seam resulting from the injection molding is formed in the part of the stiffening ring situated between the recesses and not in the part of the ring at the bottom of the respective recesses which is already weak.

Furthermore according to the invention at least one side surface of the sealing ring lip portion located between the stiffening ring and the bottom of the groove may have protuberances and depressions, which are compressed and made smaller respectively in the radial direction of the pipe when both the sealing ring and the stiffening ring have been secured in their places in said groove and the lip portions of said sealing ring have at the same time been deformed by the inserted pipe end. A very effective sealing is thus provided, permitting the sealing means at the same time to compensate for the differences of dimension that may occur within the diametrical range, in which the individual sealing means is to be used. It is then possible for the material in the protuberances in the lip portion in question to be displaced by the bottom wall surface of the groove and by the stiffening ring towards the adjacent depressions and to be received into said depressions.

According to the invention the protuberances and the depressions may be situated on the side surface of said lip portion abutting said stiffening ring.

Moreover according to the invention the protuberances may be bumps, which together with corresponding depressions are evenly distributed over one or more side surfaces of the lip portion in question, whereby it is possible for the sealing ring to fit many different types of stiffening rings.

According to the invention the protuberances and depressions may furthermore consist of one or more continuous circumferential bulges and corresponding circumferential depressions, whereby an even distribution of biasing forces in the sealing ring is achieved, making the seal especially effective.

According to the invention the stiffening ring completely or partially surrounded by the lip portions may furthermore have at least one through aperture completely interrupting the peripheral continuity of the stiffening ring, and the outer lip portion of the sealing ring may have an inwardly extending projection corresponding to each aperture in said stiffening ring, said projection being received into the respective aperture in said stiffening ring. This permits the sealing means to be easily inserted into position in the groove of the pipe end portion, as a part of the sealing ring outside the aperture in the stiffening ring may be deformed radially and inwardly during the insertion, optionally by manual impression. The above-mentioned part is not released until the sealing ring and the stiffening ring are situated radially outside the groove of the pipe end portion. Because of the aperture or apertures the stiffening ring is relatively easily manufactured by, for example, cutting suitable lengths from a strip material. The inwardly extending projection received into the apertures in the stiffening ring allows for compensation of differences of dimension and for the taking up of the spreading parts of the sealing ring material when the latter is pressed against the bottom of the groove in the pipe end portion. The aperture or apertures in the stiffening ring ensure at the same time that the sealing ring is not permanently deformed, although the sealing ring is deformed as mentioned during insertion into its position in the groove. When the draftsman gives the inwardly extending projections a certain size, the sealing ring may provide a certain pre-compression in the stiffening ring. At the same time the stiffening ring may press the sealing ring tightly against the bottom of the groove.

Also the stiffening ring may according to the invention be mounted in a circumferential auxiliary groove in the outer or inner lip portion, said auxiliarly groove only being interrupted by the projection or projections extending radially inwardly from the outer lip portion. By this means continuity between the separate parts of the sealing means is ensured.

An embodiment of the pipe that is particularly suitable as a pressure pipe is according to the invention characteristic in that the sealing ring, in which the stiffening ring is mounted, is formed so that at least in compressed state, when the spigot end of a second pipe has been inserted therethrough, said sealing ring shows an inner circumferential cavity, and in that the end of the sealing ring farthest from the mouth of the pipe end portion is provided with at least one access channel situated so that it brings the interior of the pipe in communication with said circumferential cavity. By this means an especially effective seal is achieved between the outer portion of the sealing ring and the bottom of the groove, as the (often great) pressure inside the pipe will always be able to move to the circumerential cavity and thus to the inner side of the outer lip portion, so that the latter is pressed hard (with great strength) against the bottom of the groove. It has been possible to prove the good sealing effect during experiments in a special sand bos, in which a pipe joint consisting of the pipe according to the invention and the spigot end of a second pipe inserted therein was buried, and in which the pressure of the sand on the pipe joint was adjustable to various values.

It is especially advantageous if the access channel or channels are formed at the free end of one or both of the lip portions of the sealing ring.

Also according to the invention the access channel or channels may advantageously be formed in a bead or ridge on the free end of one, preferably the inner, lip portion, or of both portions.

Furthermore according to the invention the access channel or channels may be formed in the end contact surfaces of the lip portions, which are compressed against each other. By this means the manufacture of the channels is made simple, since said channels may for example be small grooves in the end contact surfaces.

It is most advantageous according to the invention if the channels are evenly distributed around the surface of the sealing ring, when viewed in peripheral direction.

The invention also relates to a pipe joint consisting of the pipe described above and the spigot end of a second pipe inserted therein.

In a pipe assembling according to the invention the sealing means may have portions providing a compression sealing (a seal as a result of the pressure from a pressurized fluid in the pipe that has moved into the circumferential cavity of the sealing ring) and portions providing a lip seal (a seal as a result of compression of the lip material because of excess of such material). When functioning correctly there is a back-up measure if one of the portions fails.

The invention will be described below with reference to the drawings, in which.

Figure 1:
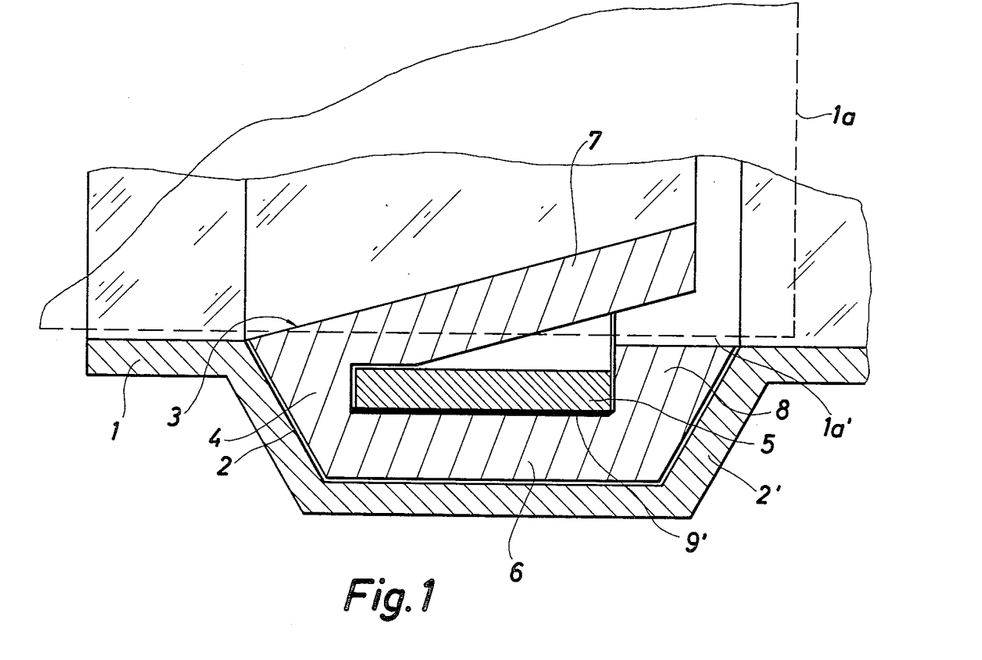
FIG. 1 is part of an axial sectional view of a pipe according to the invention extending from the mouth of the pipe end portion, and in which a lubricant has been applied between the outer lip portion of the sealing ring and the stiffening ring.

The pipe shown in FIG. 1 has an end portion 1, the inner wall of which is provided with a circumferential groove 2. A sealing means (undeformed in the drawing) having the general reference number 3 is mounted in the groove and comprises a sealing ring 4, preferably of rubber, and a stiffening body 5, for instance a stiffening ring, in cooperation with the sealing ring. The stiffening body is adapted to press the sealing ring 4 against the bottom of the groove 2 to prevent the sealing means from being forced out of the groove when the spigot end 1a of a second pipe is inserted into the pipe end portion 1.

The sealing ring 3 is substantially V-shaped in cross-section and consists of two circumferential lip portions 6 and 7, of which the outer lip portion 6 is adapted to abut the bottom of the groove 2, whereas the inner lip portion 7 extends diagonally and inwardly from the front end of the sealing means as shown. The stiffening body 5, which has a rectangular cross-section in the embodiment of the invention shown in the drawing, is mounted in an auxiliary groove 6a in the outer lip portion 6.

As shown the lengths of both lip portions 6 and 7 are such that the lip portions extend farther into the pipe than does the rearmost end of the stiffening body 5 when viewed from the pipe end. The lip portion 6 is furthermore provided with a circumferential bead or ridge 8 along its free edge behind the stiffening body 5. The dimensions of the ridge or bead 8 are such that when the second pipe 1a has been inserted, there is more volume of material between the outer wall 1a' of the second pipe and the bottom of the depression 2 than there is room for, and for this reason the sealing ring material must be displaced behind the stiffening body as well. This space, which becomes completely filled up with lip material, extends axially from the rear wall 2' of the groove 2 to the stiffening body 5, whereas the space extends radially from the bottom of the groove 2 to the outer surface 1a' of the spigot end 1a.

The lip material is primarily compressed in the above-mentioned space, but is also displaced a little as mentioned above.

Both lip portions 6 and 7 may optionally have a circumferential bead or ridge along their free edge behind the stiffening body 5. Such beads 8' and 8" on the lip portion are particularly clearly shown on the lip portions in FIG. 2. Furthermore the pipe shown in FIG. 2 corresponds essentially to the one shown in FIG. 1.

Figure 2:
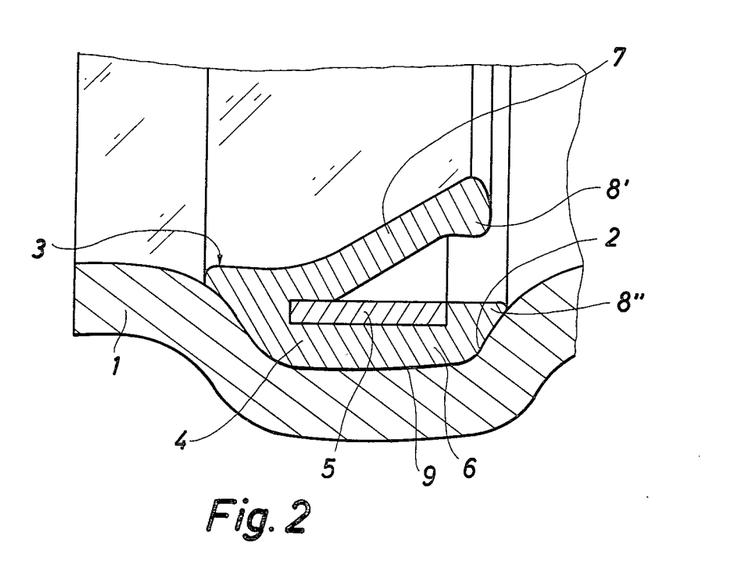
FIG. 2 is part of an axial sectional view of another embodiment of the pipe according to the invention (extending from the mouth of the pipe end portion), in which a lubricant has been applied between the outer lip portion of the sealing ring and the bottom of the groove.

A suitable lubricant 9 is provided between the sealing ring 3 and the bottom of the depression 1, said lubricant ensuring that the lip material may more easily be displaced and distributed under the stiffening body 5 towards the mouth of the pipe end portion. The lubricant may, however, be applied between the stiffening body 5 and the outer lip portion 6, as shown by 9' in FIG. 1. The lubricant may be of many different types, such as talcum powder, graphite, molybdenum sulphide. Other lubricants may be used, such as wax with low surface friction, such as polyfluorinated waxes and polyethylene wax. The same is true of lubricants such as silicone grease and cup grease as well as only substances such as silicone oil.

Figure 3:
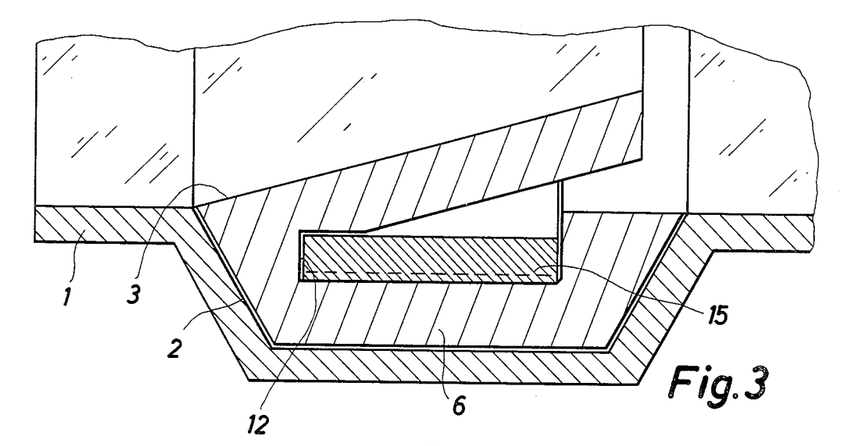
FIG. 3 is an axial sectional view of the end of a pipe, in which a sealing means with a stiffening ring that may be bent temporarily into a kidney-like shape has been mounted.

The pipe shown in FIG. 3 corresponds to the pipes mentioned above; however, the stiffening body 15, a ring, which is mounted in an auxiliary groove 12 in the outer lip portion 6, is formed in a special way.

Figure 4:
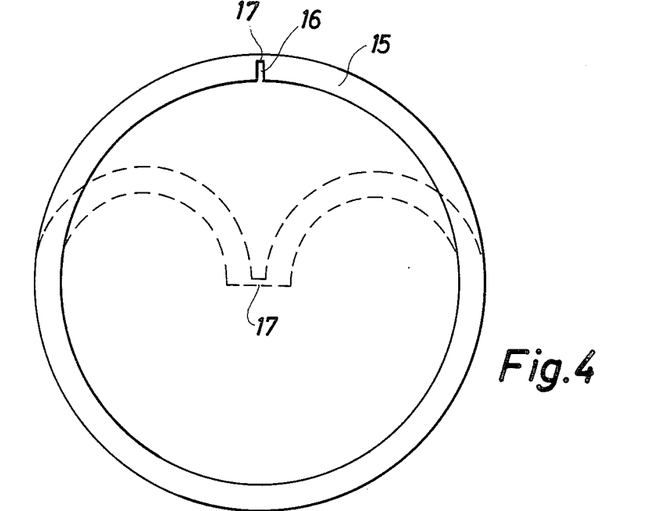
FIG. 4 is a stiffening ring corresponding to the one used in FIG. 3, viewed from the front in undeformed (i.e. circular) and deformed (i.e. kidney-shaped) state.

First of all the stiffening ring 15 is a very sturdy type and has a substantially rectangular cross-section, but besides this it has an axial recess in the form of a recess, such as a notch 6, whose width and depth is such that when mounting the entire sealing means, the stiffening ring may be (manually) deformed and given the kidney-like contour indicated by the dotted lines in FIG. 4. Consequently the thin part 17 of the ring situated at the bottom of the notch functions as a hinge.

Figure 5:
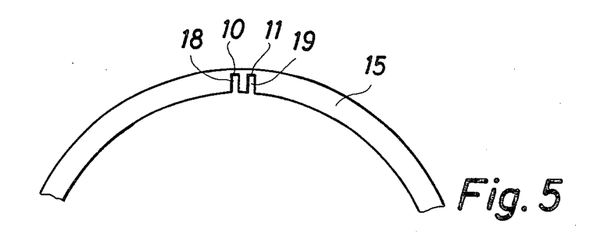
FIG. 5 is part of another embodiment of the stiffening ring.

The other embodiment of the stiffening ring shown in FIG. 5 is provided with two axial notches 18 and 19, the ring thus having two thin-walled parts 10 and 11, which together function as a hinge when the stiffening ring is mounted.

The stiffening ring may be made of any suitable material, such as metal or plastic. It may, for example, be injection molded out of polypropylene, which is suitable for forming hinge-like parts capable of withstanding many mountings and dismountings.

The stiffening ring may also have another cross-section than a rectangular one, just as the recess or recesses may have another shape than the one shown, provided that the wall thickness of the material at the bottom of the recesses is so little that said material may function as a hinge during the above-mentioned deformation of the stiffening ring.

Figure 6:
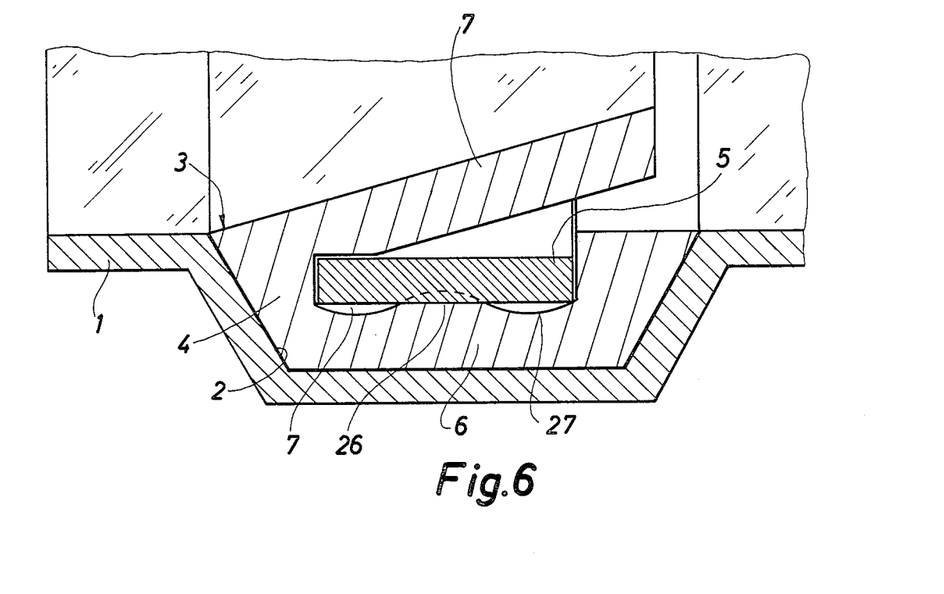
FIG. 6 is an axial sectional view of a pipe end portion, in which a sealing means with a sealing ring that has protuberances and depressions on a surface, has been mounted.

A pipe is shown in FIG. 6, in which the inner surface of the lip portion 6 of the sealing means 4 has a circumferential bulge or protuberance 26 between two circumferential depressions 27. Before the stiffening ring is mounted the protuberance 26 has the contour indicated by the dotted lines, whereas after the stiffening ring has been mounted the protuberance shown in FIG. 6 has a flatter, more compressed contour, since the material in the protuberance 26 in this case is displaced into the adjacent depressions 27. Consequently the lip portion 6 becomes tightly fixed between the bottom of the groove 2 and the stiffening ring 5.

Figure 7:
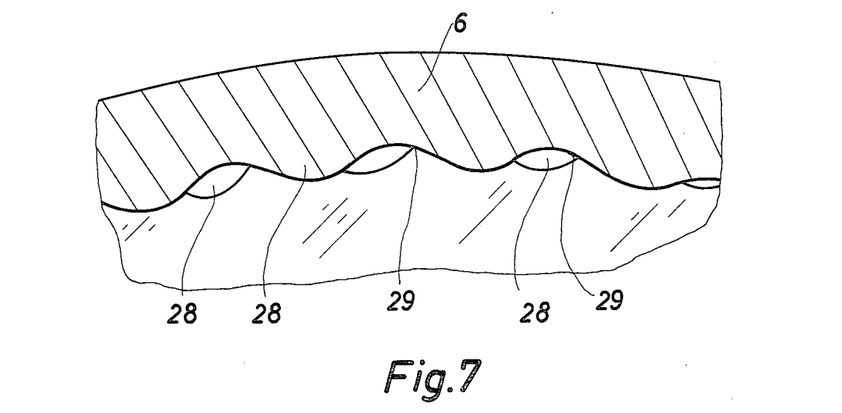
FIG. 7 is a radial sectional view of a part of another embodiment of the sealing ring.

Instead of a circumferential protuberance the underside of the lip portion 6 may be provided with protuberances in the form of evenly distributed bumps 28, between which there are depressions 29, into which the material in the bumps may be forced when the sealing means is mounted in its position in the inner groove 2 in the pipe end portion 1.

Instead of a single circumferential ridge 26, the lip portion 6 may have several circumferential ridges surrounded by circumferential depressions, just as the lip portion 6 in certain cases may be provided with axially extending ridges (not shown) evenly distributed around the entire surface. Furthermore the protuberances and depressions mentioned above may also be formed on the side of the lip portion 6 abutting the groove 2.

Figure 8:
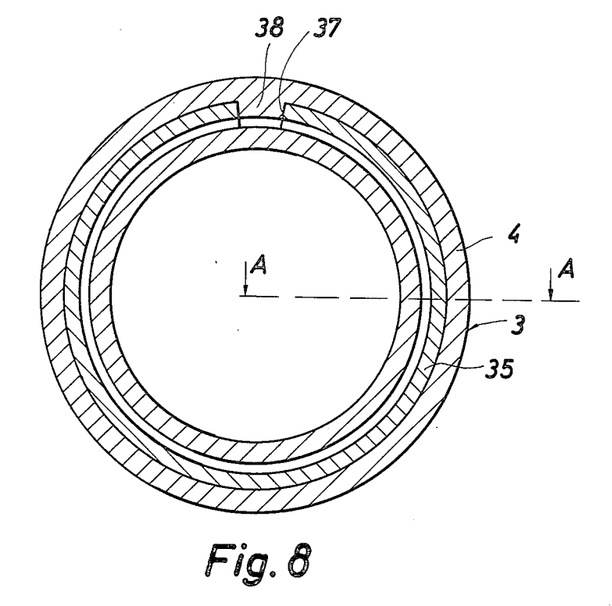
FIG. 8 is a radial sectional view of a sealing means according to the invention, which is easily deformed during insertion into a groove in the pipe end portion, as the stiffening ring has only one through aperture.
Figure 9:
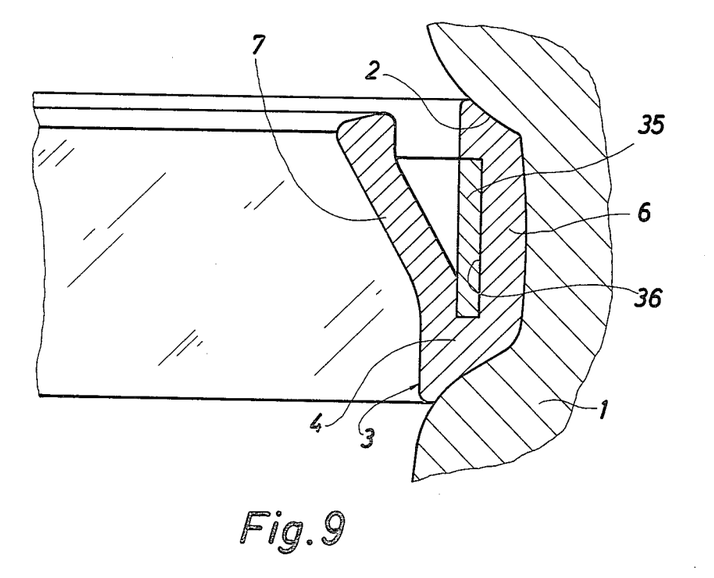
FIG. 9 is on a larger scale an axial sectional view taken along the line A—A in FIG. 1, said section showing the sealing means mounted in the groove in the pipe end portion, the latter being only shown in part.

The pipe in FIG. 8 and 9 corresponds to the pipes mentioned above; however, in the present embodiment the stiffening ring 5 and the sealing ring 4 are formed such that the sealing means 4 may be easily deformed when said sealing means is to be positioned in the groove 2. The stiffening ring 5 is situated in the auxiliary groove 6a and has a through aperture 37 completely interrupting the peripheral continuity of the annular body in one spot. A projection 38 on the sealing ring (i.e. on the outer lip portion 6) extends radially and inwardly through said aperture 37 and fills it completely up.

Figure 10:
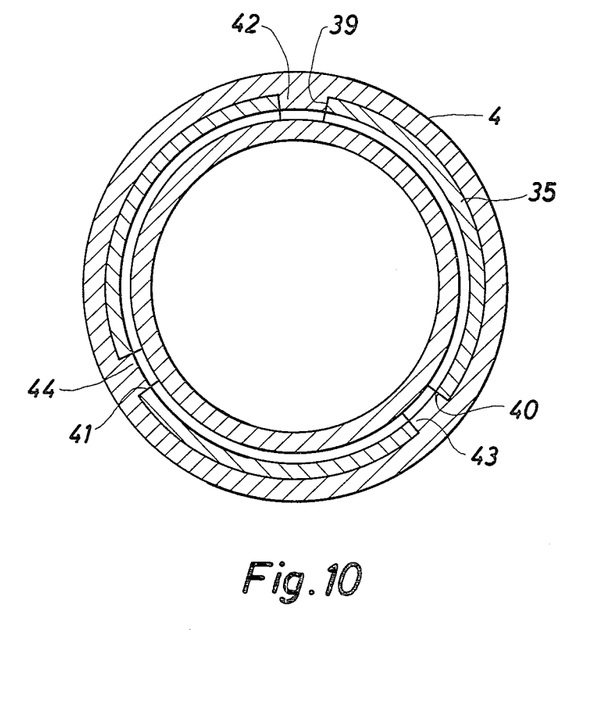
FIG. 10 is another embodiment of a sealing means, in which the stiffening ring has three through apertures.

The shape of the sealing ring and the stiffening ring shown in FIG. 10 is characteristic in that it has three through apertures 29, 40 and 41, each of which is filled up by the inwardly extending projection 42, 43 and 44 on the sealing ring 4.

The stiffening ring may in this case be made of many different types of material, for example metal or plastic. It may possibly be made by cutting a strip of plastic.

It should be noted that the lip portions 6 and 7 of the sealing ring completely or partially surround the stiffening ring. The projections and the apertures in the stiffening body corresponding to the projections may have other types of cross-sections than the ones shown.

Figure 11:
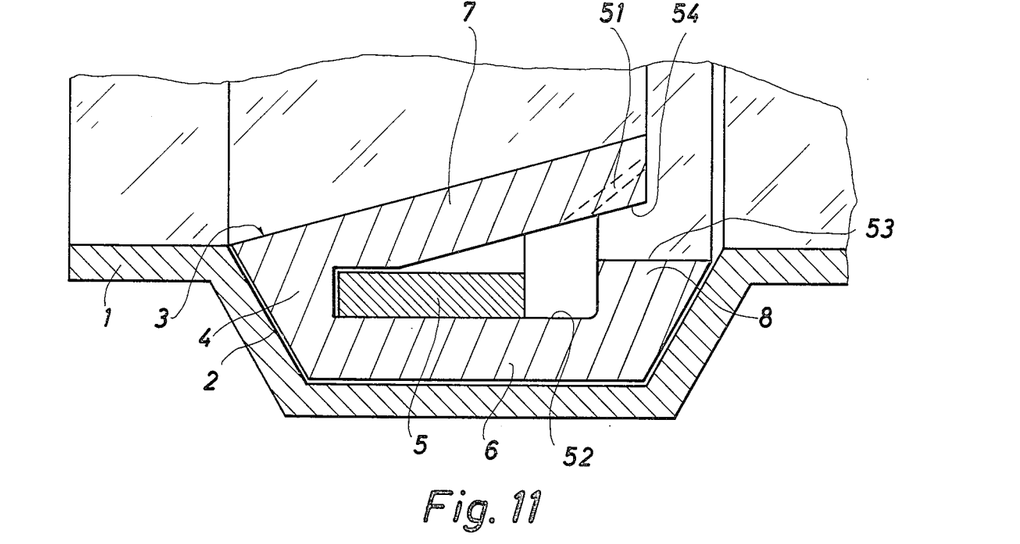
FIG. 11 is part of an axial sectional view of a pipe according to the invention extending from the mouth of the pipe end portion, as the sealing ring is shown undeformed, and the inner lip portion of the sealing ring is provided with an access channel at its rearmost end, said pipe being especially suited as a pressure pipe.
Figure 12:
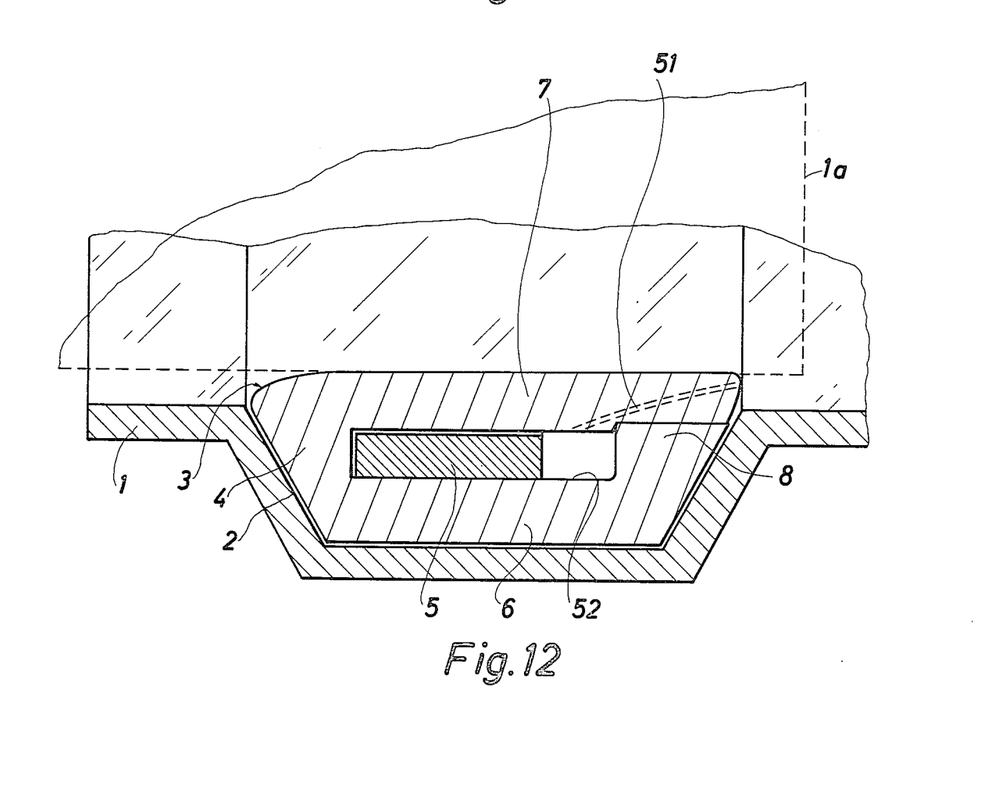
FIG. 12 is the same as FIG. 11; however, the sealing means is deformed.

The pipe illustrated in FIGS. 11 and 12 corresponds to the ones described above, but the sealing ring 4 is specially formed. As shown the inner lip portion has at least one access channel 51, which will also be open when the spigot end 1a has been inserted in the pipe end portion 1, so that the pressure medium flowing through the pipe end portion 1 may freely flow into one of the circumferential cavities 52 formed by the lip portions 6 and 7. Consequently the pressure may be equalized, so that the lip portion 6 is pressed outwards with great strength, tightly abutting the bottom of the groove 2. If both lip portions or only one has a ridge at its rearmost end, i.e. behind the stiffening ring, the ridge or ridges may be broken through by said channels. When the channels are being put into position, they must not be blocked by the spigot end 1a of the inserted pipe. In FIG. 11 the sealing ring is undeformed; in FIG. 12 it is compressed.

Figure 13:
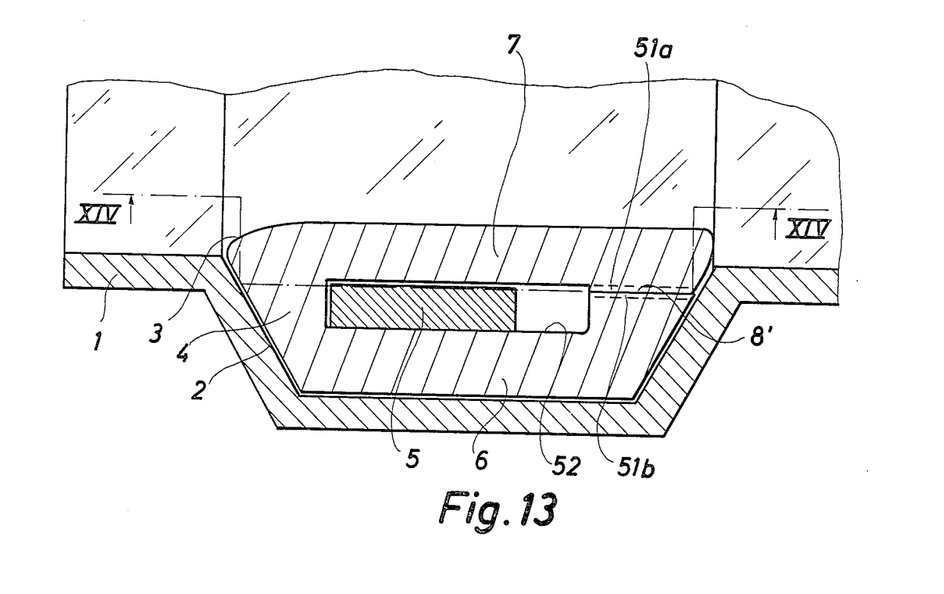
FIG. 13 is another embodiment of the pipe, in which the access channels of the sealing means are located at the end contact surfaces of the lip portions, which are compressed against each other.

As shown in FIG. 13 the channels may be formed in the end contact surfaces 53 and 54 of the lip portions 6 and 7, which are compressed against each other. They are made up of small grooves 51a and 51b, which may possibly be opposite each other.

Figure 14:
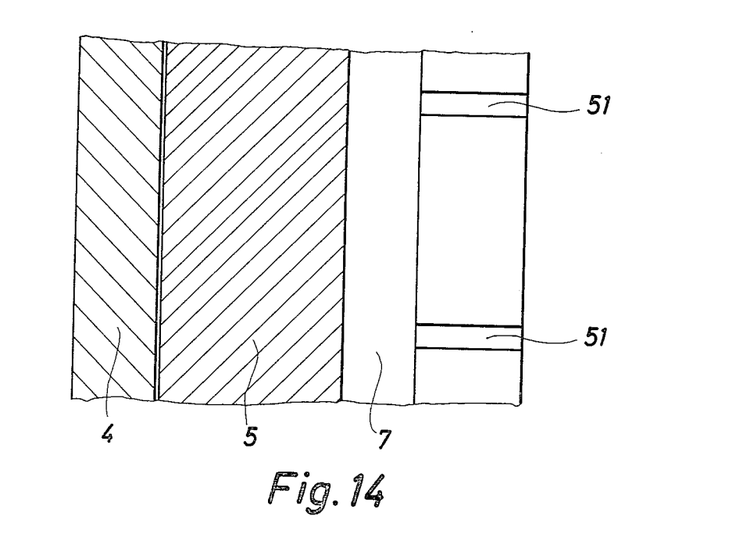
FIG. 14 is a sectional view taken along line XIV—XIV in FIG. 13, showing part of the inner lip portion, whereby two access channels are seen on a ridge at the rear end of the lip portion.

In FIG. 14 part of the lip portion 7 is shown, and the way in which the little groove 11a is placed on the ridge 8' of the lip portion.

Figure 15:
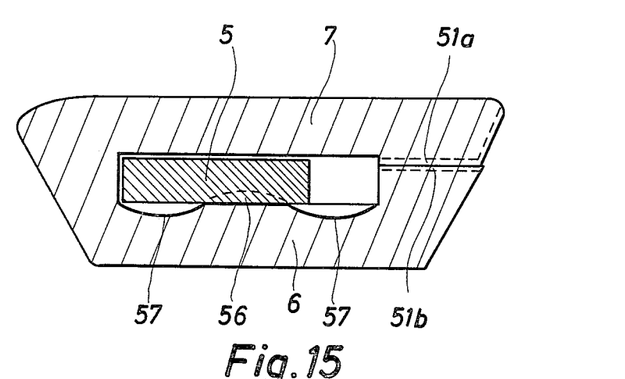
FIG. 15 is a sealing ring, in which the access channels are formed in a ridge on the outer as well as the inner lip portion, and in which protuberances and depressions are provided on the surface of the outer lip portion facing the stiffening ring.

In FIG. 15 it is clearly visible that if the side of the lip portion 6 facing the stiffening ring 5 is provided with protuberances 56 and depressions 57, the access channels 11a' must be placed so as to always be adjacent to the depressions 57. If they are placed in the vicinity of the protuberances 56, they may be blocked during the compression of the sealing ring, when the spigot end of the second pipe is inserted in the sealing means.

A lubricant may be applied to the side surface of the lip portion 6 facing the sealing ring 5, so that the material of the lip portion 6 may more easily be distributed around the stiffening ring, when the pipe joint is established.

The circumferential cavity 52 may in certain cases be very little, namely when there is only a little clearance between the stiffening ring and the lip portions 6 and 7, cf. FIG. 13.

Figure 16:
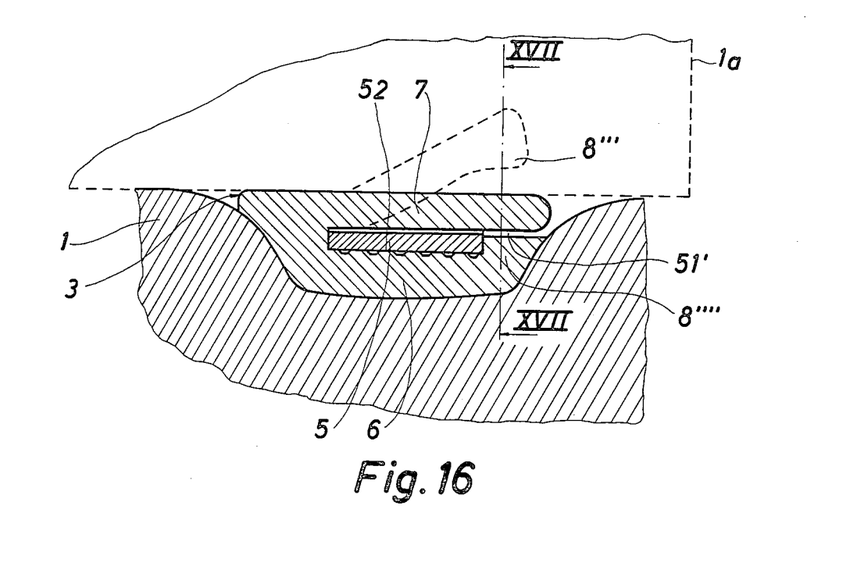
FIG. 16 is an axial sectional view of part of a pipe according to the invention, in which the sealing ring may provide two kinds of seal.

The sealing ring in the sealing means shown in FIG. 16 may provide a seal in two different ways, which support each other, i.e. by compression sealing, by the pressurized fluid in the circumferential cavity 52' of the sealing ring pressing the lip portion 7 outwards, and by the lip sealing, by compression of the lip material behind the stiffening ring 5 (seen from the mouth of the pipe end portion 1'), because there is more lip material here than there is room for, cf. that the lip portion 7 has a ridge 8''', which is pressed radially outwards towards the ridge 8'''', when the spigot end 1a of a second pipe is inserted through the sealing ring.

Figure 17:
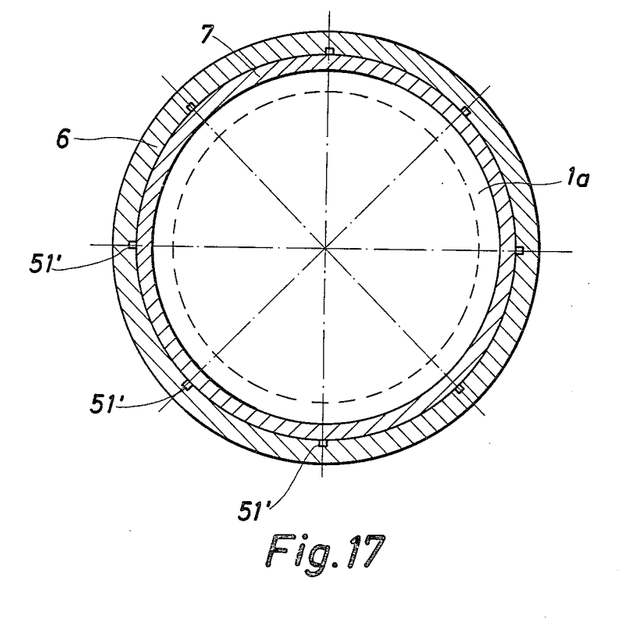
FIG. 17 is the same as FIG. 16; taken along line XVII—XVII in FIG. 16, from which it is clearly seen how the access channels are distributed around the surface of the sealing ring.

In FIG. 17 it can be seen how the access channels 51' may be placed in the outermost lip portion 6 on the sealing ring, as they are distributed around the surface of the sealing ring when viewed in peripheral direction.

Many changes may be made without deviating from the spirit and scope of the invention as set forth in the appended claims.

We claim:

1. A pipe joint comprising bell and spigot pipes, the inner wall of said bell pipe (1) having a circumferential groove (2) defining a space in which a sealing means (3) is mounted said sealing means (3) comprising a sealing ring (4) preferably of rubber, having a substantially V-shaped cross-section when undeformed consisting of at least two lip portions (6, 7), and a stiffening body (5) in cooperation with said sealing ring (4) for holding one of said lip portions in said groove (2), characterized in that the sealing means (3) has portions (6, 7, 52, 51, 51A, 51B, 51') providing a compression seal between said pipes, the lengths of the lip portions (6, 7) of said sealing ring (4) being such that both lip portions, when seen from the mouth of the bell pipe end portion, extend further into the pipe than said stiffening body (5), and in that the dimensions of said lip portions (6, 7) are such that there is more volume of lip material behind said stiffening body (5), when viewed from the mouth of the bell pipe end, than there is room for in the space defined by the circumferential groove space confined by the adjacent part of the bottom (2) of the groove, the exterior of the spigot pipe (1a) to be inserted into the bell pipe (1) the rearmost sidewall (2') of the groove and the stiffening body (5), so that the lip material in a state of compression and deformation substantially fills up said space.

2. A pipe as claimed in claim 1, characterized in that one or both of the lip portions of the sealing ring has a circumferential bead or ridge (8) along its outer edges, i.e. substantially behind said stiffening body (5) when viewed from the mouth of the pipe end portion (1), the bead beind of essential height compared to the wall thickness of the lip.

3. A pipe as claimed in claim 1 or 2, characterized in that a lubricant (9) is provided only between said sealing ring (3) and the bottom of said groove (2).

4. A pipe as claimed in claim 3, characterized in that a lubricant (9') is provided between said sealing ring (3) and said stiffening body (5).

5. A pipe as claimed in claim 4, characterized in that the stiffening body surrounded by said lip portions (6, 7) is a stiffening ring (15) having one or more axial recesses, such as notches (16, 18, 19), extending radially and inwardly, and being formed so that the parts (10, 11, 17) of said stiffening ring around said recess or recesses may be pressed inwardly so that the stiffening ring may be deformed to a kidney-like shape (FIG. 4).

6. A pipe as claimed in claim 1 or 2, characterized in that the stiffening ring (14) has a substantially rectangular cross-section.

7. A pipe as claimed in claim 6, in which the stiffening ring (14) has two recesses (18, 19), characterized in said recesses (18, 19) being arranged in close proximity of each other.

8. A pipe as claimed in claim 1, characterized in that at least one side surface of the sealing ring lip portion (6) situated between said stiffening ring (5) and the bottom of said groove (2) has protuberances (26) and depressions (27), which are compressed and made smaller respectively in the radial direction of the pipe when both the sealing ring (3) and the stiffening ring (5) have been secured in their places in said groove (2) and the lip portions of said sealing ring have at the same time been deformed by the inserted pipe end.

9. A pipe as claimed in claim 8, characterized in that said protuberances (26) and said depressions (27) are situated on the side surface of said lip portion (6) abutting said stiffening ring (5) (FIG. 6).

10. A pipe as claimed in claim 8 or 9, characterized in that said protuberances are bumps (28), which together with corresponding depressions (29) are evenly distributed over one or more side surfaces of said lip portion.

11. A pipe as claimed in claim 8 or 9, characterized in that said protuberances (26) and depressions (27) consist of one or more continuous circumferential bulges (26) and corresponding circumferential depressions (27).

12. A pipe as claimed in claim 1 or 2, characterized in that the stiffening ring (5) completely or partially surrounded by said lip portions has at least one through aperture (37, 39, 40, 41) completely interrupting the peripheral continuity of said stiffening ring, and in that the outer lip portion (6) of said sealing ring (4) has an inwardly extending projection (38, 42, 43, 44) corresponding to each aperture in said stiffening ring (5), said projection being received into the respective aperture in said stiffening ring (5).

13. A pipe as claimed in claim 12, characterized in that the stiffening ring (35) is mounted in a circumferential auxiliary groove (36) in the outer or inner lip portion, said auxiliary groove (36) only being interrupted by the projection or projections extending radially inwardly from the outer lip portion (6).

14. A pipe as claimed in claim 1 or 2, and particularly suitable as a pressure pipe, characterized in that the sealing ring (4), in which a stiffening ring (5) is mounted, is formed so that at least in compressed state, when the spigot end (1a) of a second pipe has been inserted therethrough, said sealing ring shows an inner circumferential cavity (52), and in that the end of the sealing ring (4) farthest from the mouth of the pipe end portion (1) is provided with at least one access channel (51, 51a, 51b, 51') situated so that it brings the interior of the pipe (1, 1a) in communication with said circumferential cavity (52).

15. A pipe as claimed in claim 14, characterized in that the access channel or channels (51, 51a, 51b, 51') are formed at the free end of one or both of the lip portions of the sealing ring (4).

16. A pipe as claimed in claim 14 or 15, characterized in that the access channel or channels (51a, 51b) are formed in a bead or ridge (8') on the free end of one, preferably the inner, lip portion (7), or of both lip portions.

17. A pipe as claimed in claim 14 or 15, characterized in that the access channel or channels (51a, 51b, 51') are formed in the end contact surfaces of the lip portions, which are compressed against each other.

18. A pipe as claimed in claims 14 or 15, characterized in that the access channels (51a, 51b, 51') are evenly distributed around the surface of the sealing ring (4) when viewed in peripheral direction.

19. A pipe as claimed in claim 18, characterized in that the stiffening body (5) is surrounded by the sealing ring (4) and serves to press said sealing ring tightly against the bottom of the groove (2).

* * * * *